United States Patent
Kim et al.

(10) Patent No.: US 10,369,986 B2
(45) Date of Patent: Aug. 6, 2019

(54) WHEEL DRIVING DEVICE AND WHEEL DRIVING METHOD FOR HYBRID CONSTRUCTION MACHINE

(71) Applicant: Doosan Infracore Co., Ltd., Incheon (KR)

(72) Inventors: Chang Hyun Kim, Suwon-si (KR); Eun Soo Jung, Yongin-si (KR); Dong Mok Kim, Yongin-si (KR); Kyeong Keun Kim, Uiwang-si (KR); Hyun Jae Seo, Ansan-si (KR); Nag In Kim, Seoul (KR); Lee Hyoung Cho, Suwon-si (KR)

(73) Assignee: DOOSAN INFRACORE CO., LTD., Incheon (KR)

( * ) Notice: Subject to any disclaimer, the term of this patent is extended or adjusted under 35 U.S.C. 154(b) by 21 days.

(21) Appl. No.: 15/112,170

(22) PCT Filed: Jan. 16, 2015

(86) PCT No.: PCT/KR2015/000469
§ 371 (c)(1),
(2) Date: Jul. 16, 2016

(87) PCT Pub. No.: WO2015/108366
PCT Pub. Date: Jul. 23, 2015

(65) Prior Publication Data
US 2016/0332619 A1    Nov. 17, 2016

(30) Foreign Application Priority Data

Jan. 16, 2014  (KR) .................. 10-2014-0005620

(51) Int. Cl.
*B60K 1/02*    (2006.01)
*B60K 1/04*    (2019.01)
(Continued)

(52) U.S. Cl.
CPC .............. *B60W 20/30* (2013.01); *B60K 1/02* (2013.01); *B60K 1/04* (2013.01); *F02D 29/06* (2013.01);
(Continued)

(58) Field of Classification Search
None
See application file for complete search history.

(56) References Cited

U.S. PATENT DOCUMENTS 7,576,642 B2 *  8/2009  Rodemer .......... A61B 5/02438
                                            280/735
8,312,959 B1 * 11/2012  Schneider ............ B62D 5/0412
                                            180/443
(Continued)

FOREIGN PATENT DOCUMENTS

CN       103052521 A       4/2013
EP       1294167 B1 *     11/2001
(Continued)

OTHER PUBLICATIONS

English translation of JP 2005-012900,A.*
(Continued)

*Primary Examiner* — Jean Paul Cass
(74) *Attorney, Agent, or Firm* — Hauptman Ham, LLP

(57) ABSTRACT

The present disclosure relates to a wheel driving device and a wheel driving method for a hybrid construction machine, in which in a construction machine having wheels, particularly, a hybrid wheel loader, by small-capacity low-speed electric motors, small-capacity high-speed electric motors, transmissions each having a clutch, and a control unit which are installed for all of the wheels each, the wheel driving device drives the low-speed electric motor during low-speed driving and drives the high-speed electric motor during high-speed driving by turning on and off the clutch during (Continued)

the low-speed driving and the high-speed driving, thereby reducing manufacturing costs of the wheel driving device, improving fuel economy of the construction machine, reducing abrasion of tires mounted on the wheels, improving durability of the tires, and ensuring traveling stability.

8 Claims, 10 Drawing Sheets

(51) Int. Cl.
    *B60K 7/00*     (2006.01)
    *E02F 9/20*     (2006.01)
    *E02F 9/22*     (2006.01)
    *B60W 20/30*     (2016.01)
    *F02D 29/06*     (2006.01)

(52) U.S. Cl.
    CPC .... *B60K 2007/003* (2013.01); *B60W 2300/17* (2013.01); *B60W 2510/0208* (2013.01); *B60W 2510/081* (2013.01); *E02F 9/2075* (2013.01); *E02F 9/2253* (2013.01)

(56) References Cited

U.S. PATENT DOCUMENTS

| | | | | |
|---|---|---|---|---|
| 9,605,414 B2* | 3/2017 | Yamada | ................ | B60K 6/387 |
| 2007/0259747 A1* | 11/2007 | Thomas | ............... | B60K 17/356 |
| | | | | 475/5 |
| 2009/0076693 A1* | 3/2009 | Kumazaki | .............. | B60K 6/442 |
| | | | | 701/55 |
| 2010/0197449 A1* | 8/2010 | Imamura | .................. | B60K 6/40 |
| | | | | 477/3 |
| 2012/0303196 A1* | 11/2012 | Kieser | ..................... | B60K 6/48 |
| | | | | 701/22 |
| 2013/0304297 A1* | 11/2013 | Ito | .......................... | B60K 6/445 |
| | | | | 701/22 |
| 2014/0157922 A1* | 6/2014 | Schneider | ................ | B62D 3/08 |
| | | | | 74/89.34 |
| 2014/0210208 A1* | 7/2014 | Wai | ........................ | B60L 11/08 |
| | | | | 290/45 |
| 2015/0094894 A1* | 4/2015 | Ito | .......................... | B60L 58/12 |
| | | | | 701/22 |
| 2015/0203104 A1* | 7/2015 | Haneda | ................. | B60W 10/02 |
| | | | | 701/22 |
| 2015/0298574 A1* | 10/2015 | Bramson | ............. | B60L 15/2045 |
| | | | | 701/22 |
| 2015/0321664 A1* | 11/2015 | Bae | ....................... | B60W 10/08 |
| | | | | 701/22 |
| 2016/0082950 A1* | 3/2016 | Monden | .................. | F16H 3/725 |
| | | | | 477/3 |
| 2016/0083930 A1* | 3/2016 | Monden | ................. | B60K 17/08 |
| | | | | 701/50 |
| 2016/0083931 A1* | 3/2016 | Monden | .................... | B60L 7/14 |
| | | | | 701/50 |
| 2016/0130786 A1* | 5/2016 | Miyamoto | ............ | E02F 9/2079 |
| | | | | 701/50 |
| 2016/0137185 A1* | 5/2016 | Morisaki | ................... | B60L 7/10 |
| | | | | 701/22 |
| 2016/0145836 A1* | 5/2016 | Yamada | ................. | B60K 6/387 |
| | | | | 701/50 |
| 2016/0237651 A1* | 8/2016 | Miyamoto | ............ | B60W 20/30 |
| 2016/0332619 A1* | 11/2016 | Kim | ....................... | F02D 29/06 |

FOREIGN PATENT DOCUMENTS

| | | |
|---|---|---|
| JP | 2005-012900 A | 1/2005 |
| JP | 2011-080257 A | 4/2011 |
| JP | 2012-062003 A | 3/2012 |
| JP | 2013-177047 A | 9/2013 |
| KR | 10-2013-0073903 A | 7/2013 |

OTHER PUBLICATIONS

English translation of JP 2012-062003,A.*
English translation of JP,2013-177047,A.*
English translation of JP,2011-080257,A.*
International Search Report dated Apr. 20, 2015 for PCT/KR2015/000469.
Chinese Office Action dated Apr. 27, 2017 for Chinese Patent Application No. 201580004628.1.

* cited by examiner

[Description of Main Reference Numerals of Drawings]

1: Actuator
2: Engine
3: Speed increaser
4: Motor generator
4': Hydraulic pump
5: Electricity storage unit
6: Inverters
9: Wheels
10: Low-speed electric motors
20: High-speed electrics motor
30: Transmissions
40: Control unit

[Description of Main Reference Numerals of Drawings]

9: Wheel
10: Low-speed electric motor
20: High-speed electric motor
30: Transmission
31: First speed reducer
32: Clutch
33: Second speed reducer
40: Control unit
41: Permissible RPM data storage unit
42: Permissible torque data storage unit
43: Data receiving unit
44: Comparison unit
45: Controller

WHEEL DRIVING DEVICE AND WHEEL DRIVING METHOD FOR HYBRID CONSTRUCTION MACHINE

CROSS REFERENCE TO RELATED APPLICATION

This application claims the priority of Korean Patent Application No. 10-2014-0005620, filed Jan. 16, 2014 in the Korean Intellectual Property Office. Further, this application is the National Phase application of International Application No. PCT/KR2015/000469 filed Jan. 16, 2015, which designates the United States and was published in Korean.

TECHNICAL FIELD

The present disclosure relates to a wheel driving device and a wheel driving method for a hybrid construction machine, and more particularly, to a wheel driving device and a wheel driving method for a hybrid construction machine, in which in a construction machine having wheels, particularly, a hybrid wheel loader, by small-capacity low-speed electric motors, small-capacity high-speed electric motors, transmissions each having a clutch, and a control unit which are installed for all of the wheels each, the wheel driving device drives the low-speed electric motor during low-speed driving and drives the high-speed electric motor during high-speed driving by turning on and off the clutch during the low-speed driving and the high-speed driving, thereby reducing manufacturing costs of the wheel driving device, and improving fuel economy of the construction machine.

BACKGROUND ART

In general, a hydraulic system for a construction machine, particularly, an excavator includes an engine which generates power, a main hydraulic pump which discharges hydraulic oil by being operated by power transmitted from the engine, a plurality of actuators which performs work, an operating unit which is manipulated to operate a desired actuator of a working machine, and a main control valve which distributes required hydraulic oil to a designated actuator by the operation of the operating unit.

However, unlike an excavator, the construction machine, particularly, a loader is a construction machine used to load excavated soil and the like onto a transport vehicle, and typically, a wheel type loader, which has wheels, is widely used because the loader needs to repeatedly perform an operation of collecting and putting soil into a bucket thereof and an operation of loading the soil onto the transport vehicle. In general, the wheel type loader having wheels is called a wheel loader.

In general, a system, which uses an engine and an electric motor as a common power source and has an electricity storage unit which is an electrical energy storage device, is referred to as a hybrid system. An automobile, which adopts the hybrid system, is called a hybrid automobile, and construction heavy equipment such as an excavator, which adopts the hybrid system, is called a hybrid construction machine.

Recently, to cope with a rapid increase in oil prices and meet various types of regulations concerning the environment, researches are being actively conducted on a hybrid construction machine that improves fuel economy by storing surplus power from the engine into the electricity storage unit and supplementing insufficient power of the engine from the electricity storage unit.

FIG. 1 is a graph related to a traction load of a wheel loader driving device in the related art, and FIG. 2 is a graph for explaining a capacity of an electric motor of the wheel loader driving device.

As illustrated in FIG. 1, the traction load of the wheel loader driving device in the related art requires high torque at a low speed (RPM), and requires low torque at a high speed. That is, as illustrated in FIG. 2, in order to implement the wheel loader driving device as a hybrid type, a high-capacity electric motor and an inverter are required to satisfy the traction load associated with a capacity of the electric motor. As a result, there is a problem in that because of the nature of the traction load of the wheel loader, it is difficult to develop a hybrid type wheel loader driving device.

LITERATURE OF RELATED ART (Patent Literature 1) Korean Patent Application Laid-Open No. 10-2013-0073903

DISCLOSURE

Technical Problem

The present disclosure has been made in an effort to solve the aforementioned problem, and an object of the present disclosure is to provide a wheel driving device and a wheel driving method for a hybrid construction machine in which in a construction machine having wheels, particularly, a hybrid wheel loader, by small-capacity low-speed electric motors, small-capacity high-speed electric motors, transmissions each having a clutch, and a control unit which are installed for all of the wheels each, the wheel driving device drives the low-speed electric motor during low-speed driving and drives the high-speed electric motor during high-speed driving by turning on and off the clutch during the low-speed driving and the high-speed driving, thereby reducing manufacturing costs of the wheel driving device, improving fuel economy of the construction machine, reducing abrasion of tires mounted on the wheels, improving durability of the tires, and ensuring traveling stability.

Technical Solution

To achieve the object of the present disclosure, the present disclosure provides a wheel driving device for a hybrid construction machine, which includes an engine which generates power, a motor generator which is connected to the engine and generates electrical energy, an electricity storage unit which is electrically connected to the motor generator, inverters which are connected to the electricity storage unit, and a plurality of wheels, the wheel driving device including: low-speed electric motors which are connected to the plurality of wheels and electrically connected to the inverters; high-speed electric motors which are connected to the plurality of wheels and electrically connected to the inverters; transmissions each having one side connected to each of the plurality of wheels, and the other side connected to the low-speed electric motor and the high-speed electric motor; and a control unit which controls transmission of driving power from the low-speed electric motor and the high-speed electric motor to the wheel via the transmission.

In addition, in another exemplary embodiment of the wheel driving device for a hybrid construction machine according to the present disclosure, each of the transmissions of the wheel driving device for a hybrid construction machine may include: a first speed reducer which is connected to the low-speed electric motor and reduces a rotational speed of the low-speed electric motor; a second speed reducer which is connected to both of the low-speed electric motor and the high-speed electric motor and reduces a rotational speed of the low-speed electric motor or a rotational speed of the high-speed electric motor; and a clutch which is installed between the first speed reducer and the second speed reducer and permits or cuts off power transmission from the low-speed electric motor to the wheel.

In addition, in another exemplary embodiment of the wheel driving device for a hybrid construction machine according to the present disclosure, the control unit of the wheel driving device for a hybrid construction machine may control to drive the low-speed electric motors during low-speed driving, and control to drive the high-speed electric motors during high-speed driving.

In addition, in another exemplary embodiment of the wheel driving device for a hybrid construction machine according to the present disclosure, the control unit of the wheel driving device for a hybrid construction machine may control to drive both of the low-speed electric motors and the high-speed electric motors together during low-speed driving.

In addition, in another exemplary embodiment of the wheel driving device for a hybrid construction machine according to the present disclosure, the wheel driving device for a hybrid construction machine may further include a speed increaser which is installed between the engine and the motor generator.

In addition, in another exemplary embodiment of the wheel driving device for a hybrid construction machine according to the present disclosure, each of the inverters of the wheel driving device for a hybrid construction machine may be separately installed to each of the low-speed electric motors and to each of the high-speed electric motors, respectively.

In addition, in another exemplary embodiment of the wheel driving device for a hybrid construction machine according to the present disclosure, the control unit of the wheel driving device for a hybrid construction machine may include: a permissible RPM data storage unit which stores permissible RPM data of the low-speed electric motor and the high-speed electric motor; a permissible torque data storage unit which stores permissible torque data of the low-speed electric motor and the high-speed electric motor; a data receiving unit which receives data related to current RPM and current torque of the low-speed electric motor or the high-speed electric motor; a comparison unit which compares the permissible RPM and the permissible torque of the low-speed electric motor and the high-speed electric motor, which are stored in the permissible RPM data storage unit and the permissible torque data storage unit, with the current RPM and the current torque of the low-speed electric motor or the high-speed electric motor which are received by the data receiving unit; and a controller which controls on/off control for the clutch so as to drive the high-speed electric motor by turning off the clutch when the current torque of the low-speed electric motor is lower than the permissible torque as a result of the comparison by the comparison unit, and to drive the low-speed electric motor by turning on the clutch when the current RPM of the high-speed electric motor is equal to or lower than the permissible RPM.

In addition, in another exemplary embodiment of the wheel driving device for a hybrid construction machine according to the present disclosure, the low-speed electric motor and the high-speed electric motor of the wheel driving device for a hybrid construction machine may have the same electric motor capacity, and a reduction ratio of the first speed reducer may be 3:1.

To achieve the object of the present disclosure, a wheel driving method for a hybrid construction machine according to the present disclosure may include: storing permissible RPM data and permissible torque data of a low-speed electric motor and a high-speed electric motor in a permissible RPM data storage unit and a permissible torque data storage unit; receiving, by a data receiving unit, data related to current RPM and current torque of the low-speed electric motor or the high-speed electric motor; comparing, by a comparison unit, the permissible RPM and the permissible torque of the low-speed electric motor and the high-speed electric motor, which are stored in the permissible RPM data storage unit and the permissible torque data storage unit, with the current RPM and the current torque of the low-speed electric motor or the high-speed electric motor which are received by the data receiving unit; and controlling, by a controller, on/off control for the clutch in accordance with a result of the comparison by the comparison unit.

In addition, in another exemplary embodiment of the wheel driving method for a hybrid construction machine according to the present disclosure, the controlling of the on/off control for the clutch of the wheel driving method for a hybrid construction machine may further include: operating only the high-speed electric motor and increasing a speed by turning off the clutch when the current torque of the low-speed electric motor is lower than the permissible torque; and operating only the low-speed electric motor and reducing a speed by turning on the clutch when the current RPM of the high-speed electric motor is equal to or lower than the permissible RPM.

Advantageous Effects

According to the wheel driving device and the wheel driving method for a hybrid construction machine according to the present disclosure, by the small-capacity low-speed electric motors, the small-capacity high-speed electric motors, the transmissions each having the clutch, and the control unit which are installed for each of all of the wheels of the hybrid wheel loader, the wheel driving device drives only the low-speed electric motor during low-speed driving and drives only the high-speed electric motor during high-speed driving by turning on and off the clutch during the low-speed driving and the high-speed driving, thereby reducing manufacturing costs and maintenance costs of the wheel driving device.

In addition, the wheel driving device and the wheel driving method for a hybrid construction machine according to the present disclosure may reduce a space in which the low-speed electric motor, the high-speed electric motor, and the inverter electrically connected to the low-speed electric motor and the high-speed electric motor are installed, and thus may improve fuel economy of the construction machine.

Furthermore, the wheel driving device and the wheel driving method for a hybrid construction machine according to the present disclosure may reduce abrasion of tires mounted on the wheels, improve durability of the tires, and ensure traveling stability.

DESCRIPTION OF MAIN REFERENCE NUMERALS OF DRAWINGS

Figure 1:
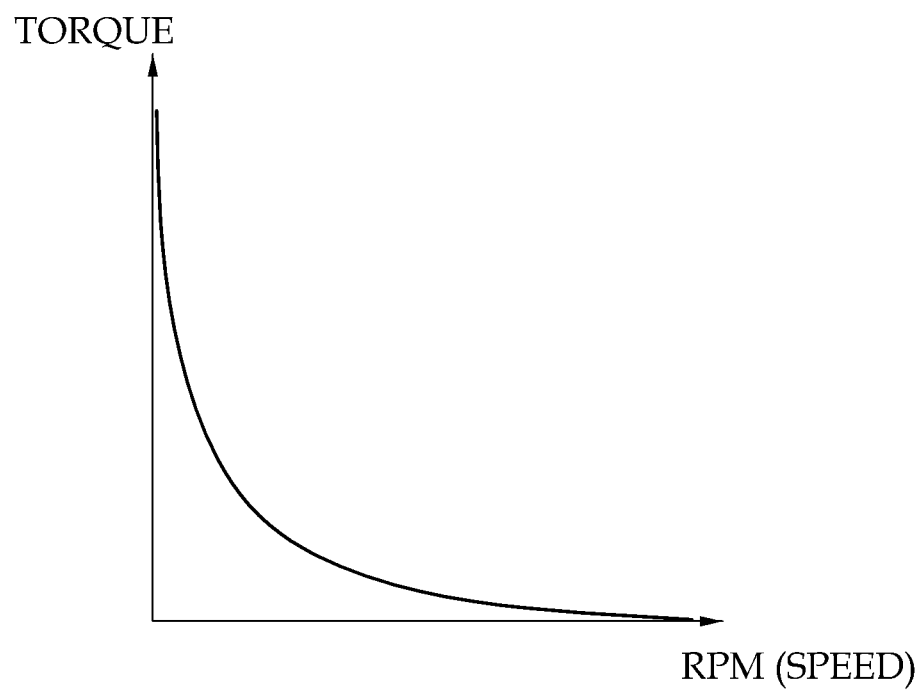
FIG. 1 is a graph related to a traction load of a wheel loader driving device in the related art.
Figure 2:
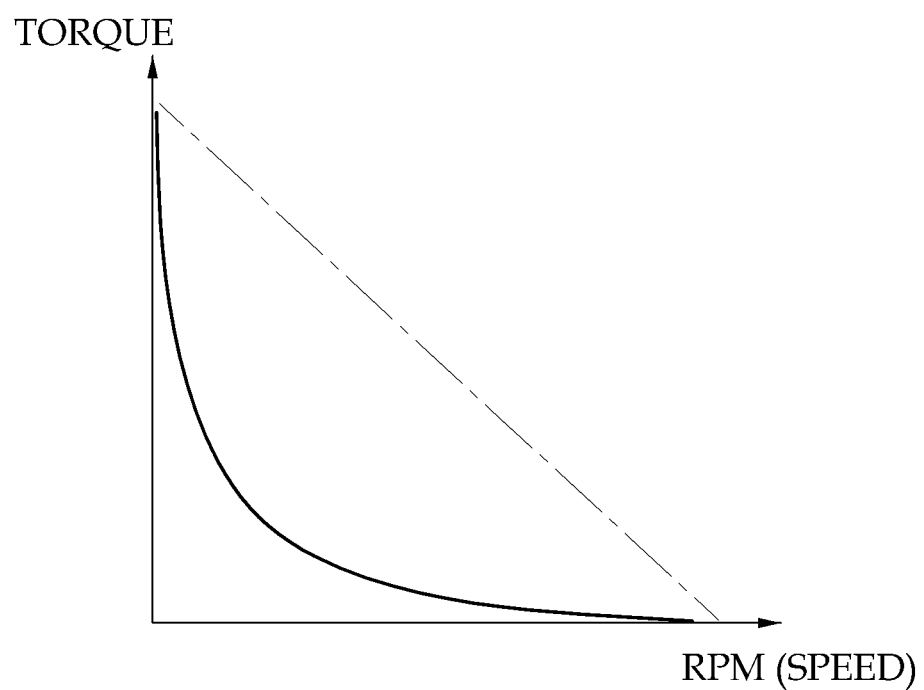
FIG. 2 is a graph related to a capacity of an electric motor of the wheel loader driving device in the related art.

1: Actuator
2: Engine
3: Speed increaser
4: Motor generator
4': Hydraulic pump
5: Electricity storage unit
6: Inverter
7: Electric motor
8: Speed reducer
9: Wheel
10: Low-speed electric motor
20: High-speed electric motor
30: Transmission
31: First speed reducer
32: Clutch
33: Second speed reducer
40: Control unit
41: Permissible RPM data storage unit
42: Permissible torque data storage unit
43: Data receiving unit
44: Comparison unit
45: Controller

BEST MODE

Hereinafter, an exemplary embodiment of the present disclosure will be described in detail with reference to the accompanying drawings. First, in denoting reference numerals to constituent elements of respective drawings, the same constituent elements will be designated by the same reference numerals.

Figure 3:
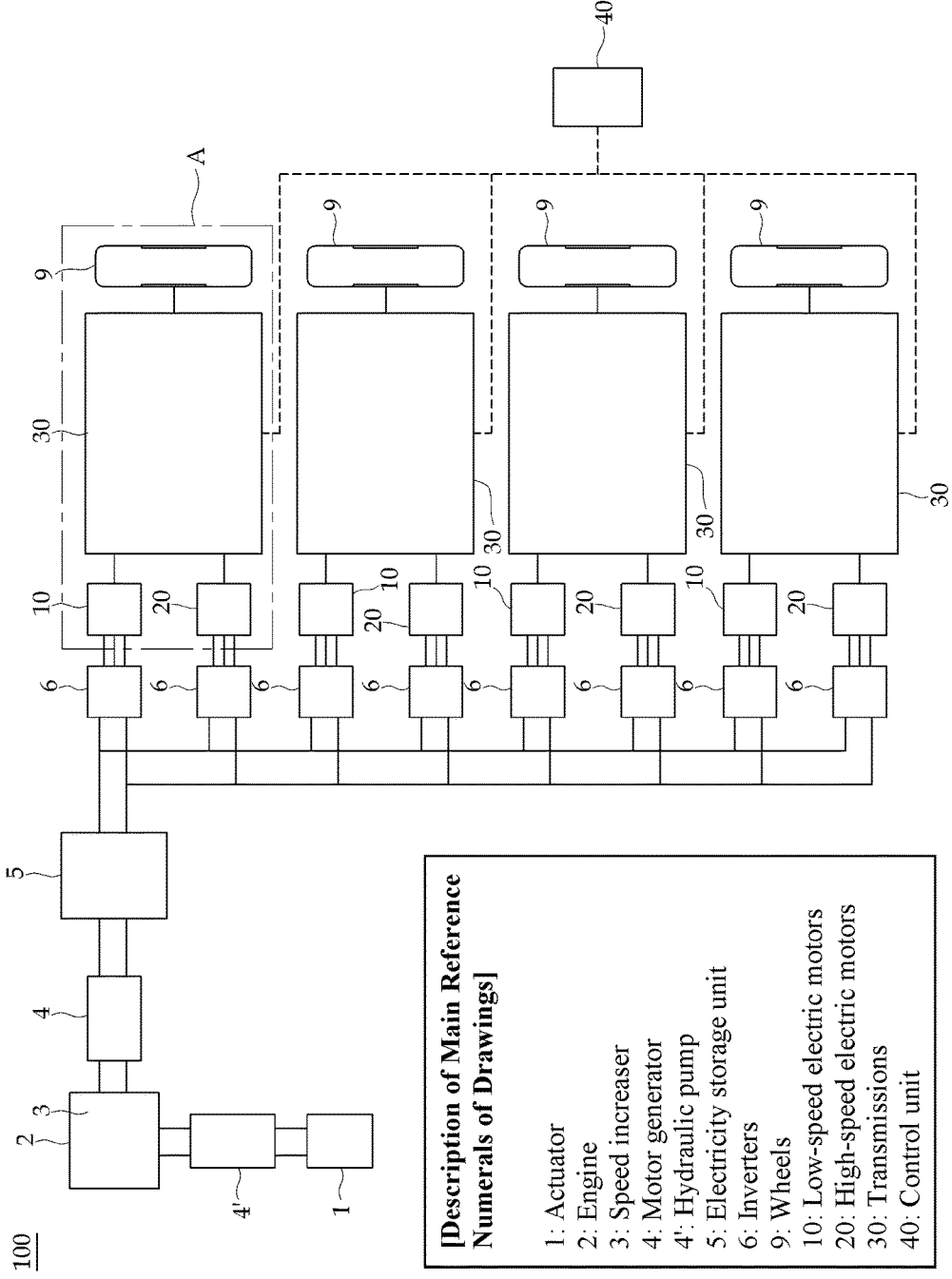
FIG. 3 is a conceptual view of a wheel driving device for a hybrid construction machine according to an exemplary embodiment of the present disclosure.
Figure 4:
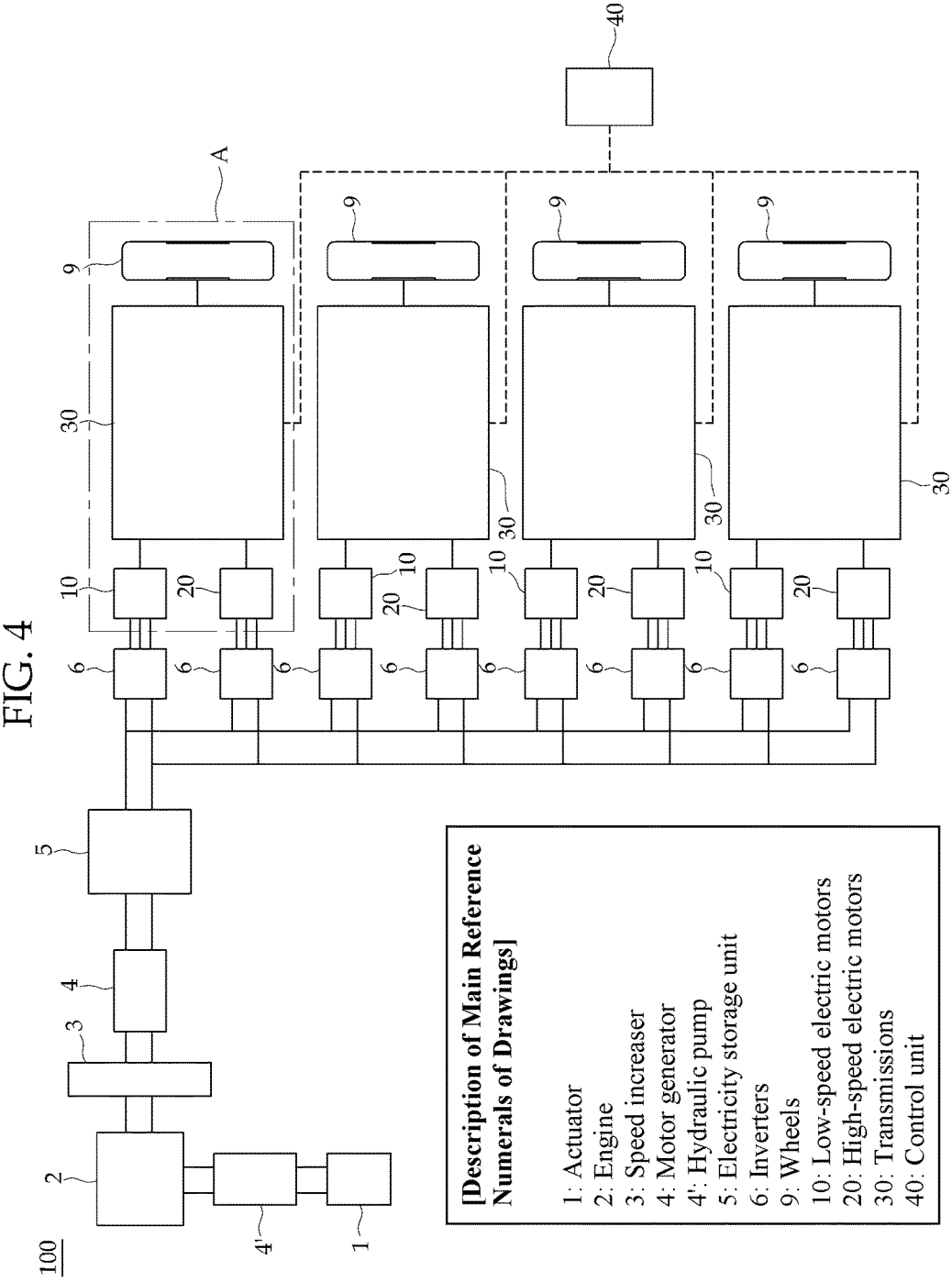
FIG. 4 is a conceptual view of a wheel driving device for a hybrid construction machine according to another exemplary embodiment of the present disclosure.
Figure 5:
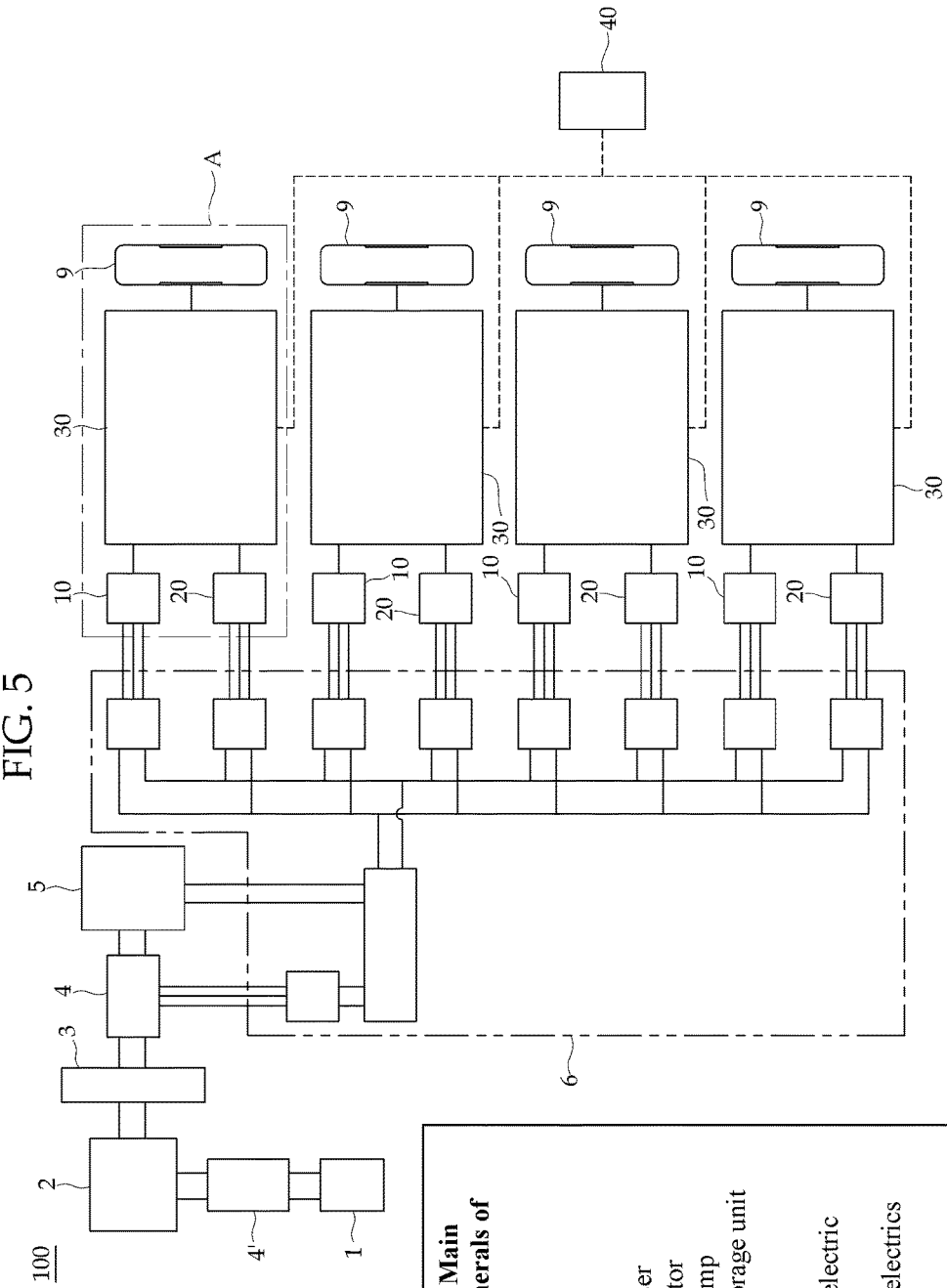
FIG. 5 is a conceptual view of a wheel driving device for a hybrid construction machine according to yet another exemplary embodiment of the present disclosure.
Figure 6:
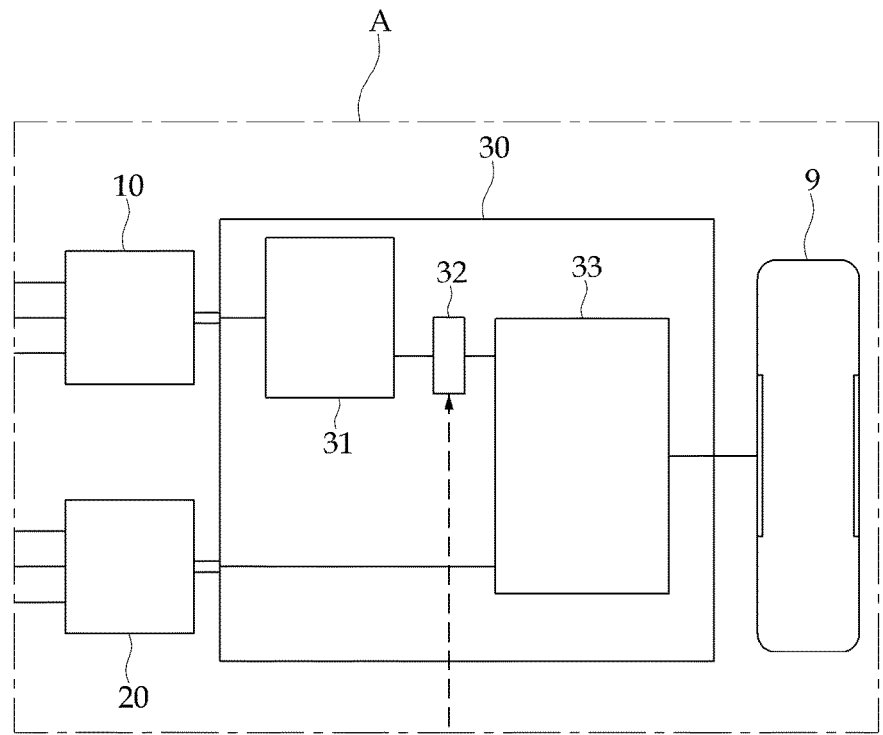
FIG. 6 is a detailed view of part A in FIG. 3.
Figure 7:
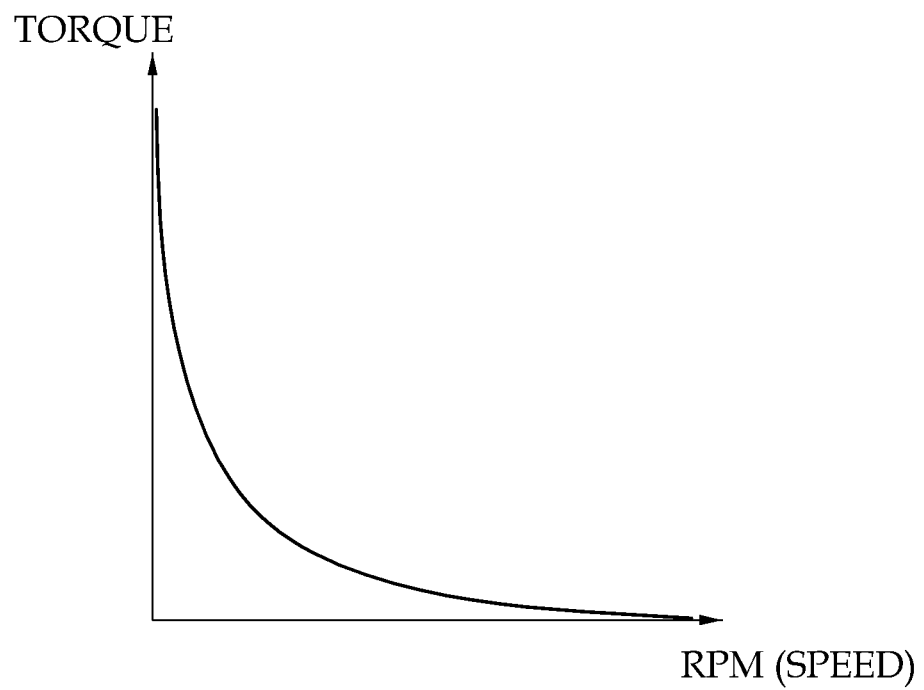
FIG. 7 is a graph related to a traction load of the wheel driving device for a hybrid construction machine according to the exemplary embodiment of the present disclosure.
Figure 8:
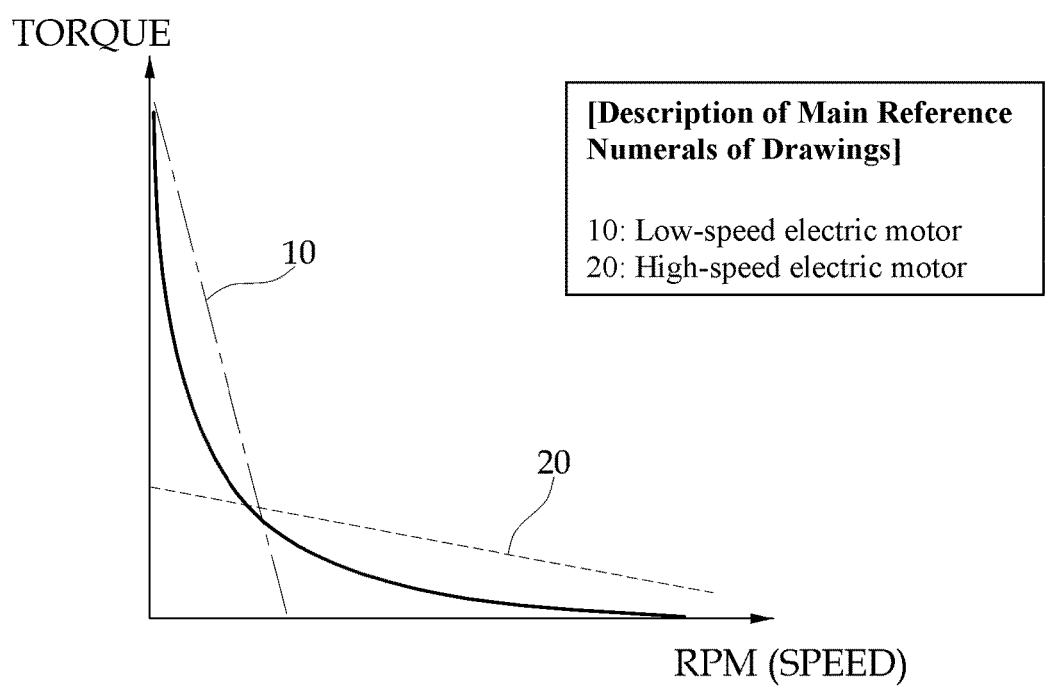
FIG. 8 is a graph related to a capacity of the electric motor of the wheel driving device for a hybrid construction machine according to the exemplary embodiment of the present disclosure.
Figure 9:
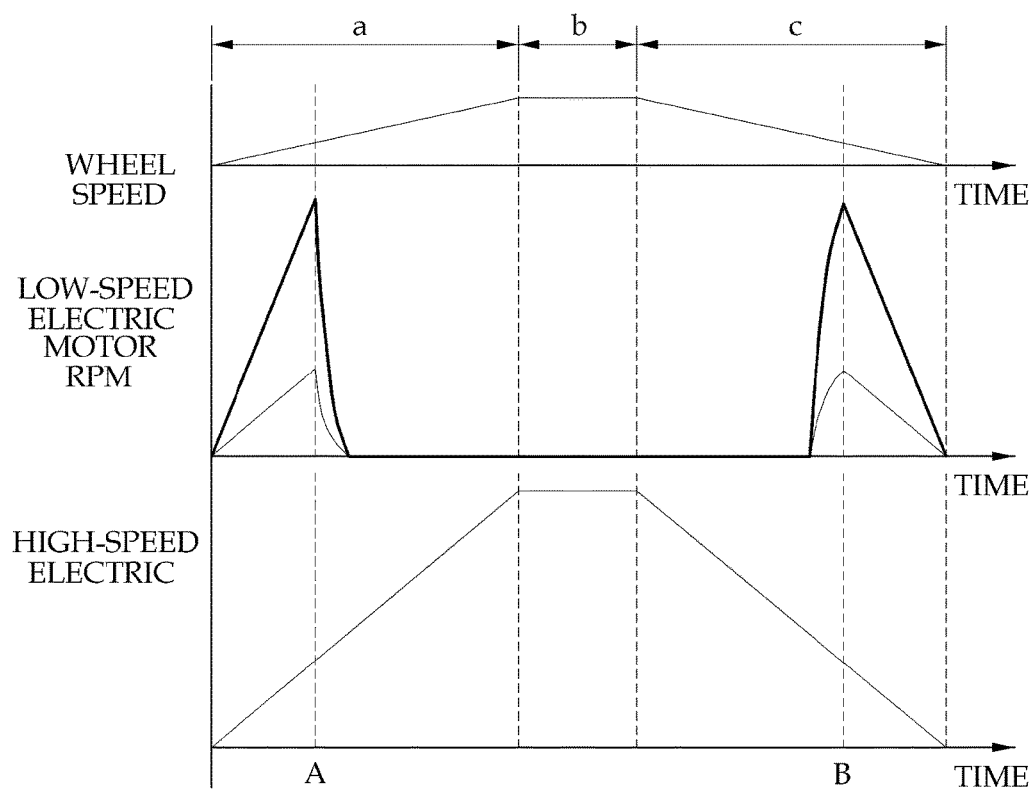
FIG. 9 is a graph for explaining a state in which a clutch of the wheel driving device for a hybrid construction machine according to the exemplary embodiment of the present disclosure is turned on and off.

FIG. 3 is a conceptual view of a wheel driving device for a hybrid construction machine according to an exemplary embodiment of the present disclosure, FIG. 4 is a conceptual view of a wheel driving device for a hybrid construction machine according to another exemplary embodiment of the present disclosure, and FIG. 5 is a conceptual view of a wheel driving device for a hybrid construction machine according to yet another exemplary embodiment of the present disclosure. FIG. 6 is a detailed view of part A in FIG. 3. FIG. 7 is a graph related to a traction load of the wheel driving device for a hybrid construction machine according to the exemplary embodiment of the present disclosure, FIG. 8 is a graph related to a capacity of the electric motor of the wheel driving device for a hybrid construction machine according to the exemplary embodiment of the present disclosure, and FIG. 9 is a graph for explaining a state in which a clutch of the wheel driving device for a hybrid construction machine according to the exemplary embodiment of the present disclosure is turned on and off.

A wheel driving device 100 for a hybrid construction machine according to an exemplary embodiment of the present disclosure will be described with reference to FIG. 3. The wheel driving device 100 for a hybrid construction machine according to the exemplary embodiment of the present disclosure includes an engine 2, a motor generator 4, an electricity storage unit 5, inverters 6, a plurality of wheels 9, low-speed electric motors 10, high-speed electric motors 20, transmissions 30, and a control unit 40.

As illustrated in FIG. 3, the wheel driving device 100 for a hybrid construction machine, particularly, a wheel loader, according to the present disclosure has the engine 2 which generates power.

The motor generator 4 is connected to the engine 2 and generates electrical energy.

The electricity storage unit 5 is connected to the motor generator 4 and stores electrical energy generated by the motor generator 4. The electricity storage unit 5 may be formed in the form of, but not necessarily limited to, a battery or a capacitor.

In addition, a hydraulic pump 4' may be installed to be directly connected to a shaft of the engine 2. The hydraulic pump 4' provides hydraulic power to an actuator 1 in order to operate a bucket and a boom. An electric motor, which is driven by electrical energy supplied from the electricity storage unit 5, may be installed on the hydraulic pump 4', and the hydraulic power provided from the hydraulic pump 4' is supplied to the actuator, thereby operating the bucket and the boom.

Four wheels 9 are connected to driving shafts.

The plurality of low-speed electric motors 10 is connected to the plurality of wheels 9, respectively. That is, if four wheels 9 are provided, the low-speed electric motor 10 is installed to each of the wheels 9, such that a total of four low-speed electric motors 10 are installed in the wheel driving device 100. In addition, the plurality of low-speed electric motors 10 is electrically connected to the plurality of inverters 6, respectively.

As illustrated in FIG. 5, an integrated inverter may be used as the plurality of inverters 6, and may be connected to the low-speed electric motors 10 and the high-speed electric motors 20. Therefore, it is not necessary to install the inverters for each of the low-speed electric motors 10 and for each of the high-speed electric motors 20, and as a result, it is possible to reduce an installation space in the construction machine, particularly, the wheel loader.

The plurality of high-speed electric motors 20 is connected to the plurality of wheels 9, respectively. That is, if four wheels 9 are provided, the high-speed electric motor 20 is installed for each of the wheels 9, such that a total of four high-speed electric motors 20 are provided in the wheel driving device 100. In addition, the plurality of high-speed electric motors 20 is electrically connected to the plurality of inverters 6, respectively.

As illustrated in FIG. 3, one inverter is installed for each of the low-speed electric motor 10 and the high-speed electric motor 20, such that a total of two inverters 6 are installed for each of the wheels 9, and if four wheels 9 are provided, a total of eight inverters 6 are installed in the wheel driving device 100 so as to be electrically connected to the electricity storage unit 5.

One side of each of the plurality of transmissions 30 is connected to each of the plurality of wheels 9, and the other side of each of the plurality of transmissions 30 is connected to each of the plurality of low-speed electric motors 10 and each of the plurality of high-speed electric motors 20. That is, if four wheels 9 are provided, one transmission 30 is installed for each of the wheels 9, such that a total of four transmissions 30 are installed in the wheel driving device 100.

The control unit 40 controls the transmissions 30 so as to drive the plurality of low-speed electric motors 10 during low-speed driving, and drive the plurality of high-speed electric motors 20 during high-speed driving. In addition, according to another exemplary embodiment of the present disclosure, the control unit 40 may control the transmissions 30 so as to drive both of the low-speed electric motor 10 and the high-speed electric motor 20 during low-speed driving. The control unit 40 may be installed in, but not necessarily limited to, a control panel in a driver seat or an electronic control unit (ECU).

According to another exemplary embodiment of the present disclosure, the low-speed electric motor 10 and the high-speed electric motor 20 may be configured as, but not necessarily limited to, small-sized electric motors having the same electric motor capacity.

As illustrated in FIG. 4, the wheel driving device for a hybrid construction machine according to another exemplary embodiment of the present disclosure may further include a speed increaser 3 installed between the engine 2 and the motor generator 4. The motor generator 4 may be rotated at an efficient rotational speed by the speed increaser 3. However, the speed increaser 3 may not be installed as necessary in accordance with specifications of the motor generator.

As illustrated in FIGS. 7 and 8, a traction load of the wheel driving device 100 for a hybrid construction machine according to the present disclosure also requires high torque at a low speed (low RPM), and low torque at a high speed (high RPM). Therefore, according to the wheel driving device 100 for a hybrid construction machine according to the present disclosure, the low-speed electric motor 10 satisfies the traction load of the wheel driving device 100 for a hybrid construction machine during low-speed driving, and the high-speed electric motor 20 satisfies the traction load of the wheel driving device 100 for a hybrid construction machine during high-speed driving. Therefore, since the two electric motors having the same electric motor capacity are installed instead of a high-capacity electric motor, it is possible to reduce an installation space, and improve efficiency of the wheel driving device.

As illustrated in FIG. 6, the transmission 30 of the wheel driving device 100 for a hybrid construction machine according to another exemplary embodiment of the present disclosure includes a first speed reducer 31, a second speed reducer 33, and a clutch 32.

The first speed reducer 31 is connected to the low-speed electric motor 10, and reduces a rotational speed of the low-speed electric motor 10. That is, one side of the first speed reducer 31 is connected to the low-speed electric motor 10, and the other side of the first speed reducer 31 is connected to the clutch 32 to be described below. According to another exemplary embodiment of the present disclosure, a reduction ratio of the first speed reducer 31 may be, but not necessarily limited to, 3:1.

The second speed reducer 33 is connected to both of the low-speed electric motor 10 and the high-speed electric motor 20 so as to reduce a rotational speed of the low-speed electric motor 10 or a rotational speed of the high-speed electric motor 20. That is, one side of the second speed reducer 33 is connected to the wheel 9, and the other side of the second speed reducer 33 is connected to the low-speed electric motor 10 and the high-speed electric motor 20. According to another exemplary embodiment of the present disclosure, a reduction ratio of the second speed reducer 33 may be 100:1.

The clutch 32 is installed between the first speed reducer 31 and the second speed reducer 33. The clutch 32 is controlled by a controller 45 of the control unit 40, which will be described below, so as to permit or cut off power transmission from the low-speed electric motor 10 to the wheel 9. That is, with the on/off control for the clutch 32, only the low-speed electric motor 10 is used when the wheel loader operates at a low speed, and only the high-speed electric motor 20 is used when the wheel loader operates at a high speed, and as a result, it is possible to improve fuel economy and efficiency.

The first speed reducer 31, the second speed reducer 33, and the clutch 32 may be configured as, but not necessarily limited to, a gear train, and reduction ratios of the first speed reducer 31 and the second speed reducer 33 may be variously modified, by changing an arrangement structure of gears or using gears having different diameters as necessary.

As illustrated in FIG. 6, the control unit 40 of the wheel driving device 100 for a hybrid construction machine according to another exemplary embodiment of the present disclosure includes a permissible revolution per minute (RPM) data storage unit 41, a permissible torque data storage unit 42, a data receiving unit 43, a comparison unit 44, and the controller 45.

The permissible RPM data storage unit 41 stores permissible RPM data of the low-speed electric motor 10 and the high-speed electric motor 20.

The permissible torque data storage unit 42 stores permissible torque data of the low-speed electric motor 10 and the high-speed electric motor 20.

A user may change the permissible RPM and the permissible torque as necessary.

The data receiving unit 43 receives data related to the current RPM and the current torque of the low-speed electric motor 10 or the high-speed electric motor 20. That is, the data receiving unit 43 receives RPM and torque of the low-speed electric motor 10 when the low-speed electric motor 10 operates, and receives RPM and torque of the high-speed electric motor 20 when the high-speed electric motor 20 operates.

The comparison unit 44 compares the permissible RPM and the permissible torque of the low-speed electric motor 10 and the high-speed electric motor 20, which are stored in the permissible RPM data storage unit 41 and the permissible torque data storage unit 42, with the current RPM and the current torque of the low-speed electric motor 10 or the high-speed electric motor 20 which are received by the data receiving unit 43.

The controller 45 performs on/off control for the clutch 32 such that when the current torque of the low-speed electric motor 10 is lower than the permissible torque as a result of the comparison by the comparison unit 44, the controller 45 turns off the clutch 32 so as to drive only the high-speed electric motor 20, and when the current RPM of the high-speed electric motor 10 is equal to or lower than the permissible RPM, the controller 45 turns on the clutch so as to drive only the low-speed electric motor 10. Therefore, it is possible to reduce manufacturing costs and maintenance costs of the wheel driving device.

Figure 10:
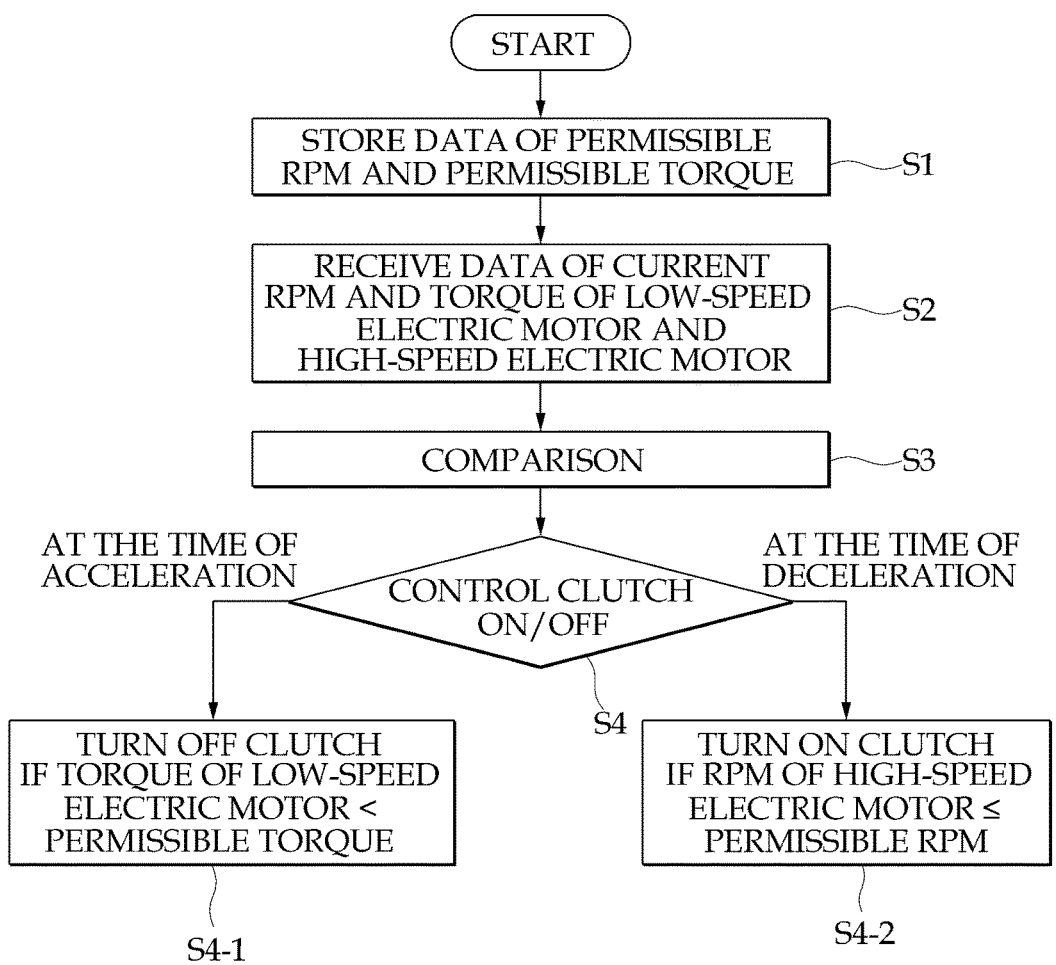
FIG. 10 is a flowchart of a wheel driving method for a hybrid construction machine according to the exemplary embodiment of the present disclosure.

FIG. 10 is a flowchart of a wheel driving method for a hybrid construction machine according to the exemplary embodiment of the present disclosure. The wheel driving method for a hybrid construction machine according to the exemplary embodiment of the present disclosure will be described with reference to FIG. 10. The wheel driving method for a hybrid construction machine according to the exemplary embodiment of the present disclosure includes step S1 of storing data of permissible RPM and permissible torque, step S2 of receiving data of current RPM and current torque of the low-speed electric motor and the high-speed electric motor, comparison step S3, and clutch on/off control step S4. In addition, as illustrated in FIG. 9, the wheel driving method for a hybrid construction machine according to another exemplary embodiment of the present disclosure may further include step S4-1 of operating only the high-speed electric motor and increasing a speed by turning off the clutch 32, and step S4-2 of operating only the low-speed electric motor 10 and reducing a speed by turning on the clutch 32.

The permissible RPM data and the permissible torque data of the low-speed electric motor 10 and the high-speed electric motor 20 are stored in the permissible RPM data storage unit 41 and the permissible torque data storage unit 42, respectively.

After step S1 of storing the data of the permissible RPM and permissible torque, the data receiving unit 43 receives data related to the current RPM and the current torque of the low-speed electric motor 10 or the high-speed electric motor 20.

After step S2 of receiving data related to the current RPM and the current torque of the low-speed electric motor and the high-speed electric motor, the comparison unit 44 compares the permissible RPM and the permissible torque of the low-speed electric motor 10 and the high-speed electric motor 20, which are stored in the permissible RPM data storage unit 41 and the permissible torque data storage unit 42, with the current RPM and the current torque of the low-speed electric motor 10 or the high-speed electric motor 20 which are received by the data receiving unit 43.

After comparison step S3, the on/off control for the clutch is performed by the controller 45 in accordance with a result of the comparison by the comparison unit 44.

Clutch on/off control step S4 further includes step S4-1 of operating only the high-speed electric motor 20 and increasing a speed by turning off the clutch 32 when the current torque of the low-speed electric motor 10 is lower than the permissible torque, and step S4-2 of operating only the low-speed electric motor 10 and reducing a speed by turning on the clutch when the current RPM of the high-speed electric motor 10 is equal to or lower than the permissible RPM.

A process in which the controller 45 of the control unit 40 of the wheel driving device 100 for a hybrid construction machine according to the exemplary embodiment of the present disclosure performs the on/off control for the clutch 32 will be described with reference to FIG. 9.

In FIG. 9, a indicates an acceleration driving section, b indicates a maximum speed driving section, c indicates a deceleration driving section, a reduction ratio of the first speed reducer 31 is 3:1, a reduction ratio of the second speed reducer 33 is 100:1. A maximum speed of the wheel 9 is 40 km/h, a radius of the wheel 9 is 0.75 m, and a maximum rotational speed (maximum RPM) of the wheel 9 is 120 RPM. The permissible RPM is 12,000 RPM, and the permissible torque is O.

In FIG. 9, the clutch 32 is maintained in an ON state at the time of initial acceleration. The clutch 32 is maintained in the ON state at the time of acceleration (within the acceleration driving section a). While the clutch 32 is maintained in the ON state, the low-speed electric motor 10 operates at 12,000 RPM which is a maximum driving rotational speed, and the high-speed electric motor rotates at 4,000 RPM which is ⅓ of the maximum driving rotational speed. When torque of the low-speed electric motor 10 reaches 0 or any value close to 0, the high-speed electric motor 10 is responsible for most of the loads of the wheel loader. That is, when torque of the low-speed electric motor 10 reaches 0 or any value close to 0, the clutch 32 is turned off during acceleration (point A in FIG. 9). In addition, at the time of deceleration, the low-speed electric motor 10 is rotated at a predetermined speed corresponding to a speed of the high-speed electric motor so as to increase a speed of the low-speed electric motor 10 so that the speed of the low-speed electric motor 10 is coincident with a speed of the clutch, and then the clutch 32 is turned on, and as a result, it is possible to reduce impact caused during a process of changing a speed.

In addition, the low-speed electric motor 10 may be installed such that within the acceleration driving section a in FIG. 9, the low-speed electric motor 10 rotates instead of being rotated by the operation of the high-speed electric motor 20, and thus is meshed with the gear train. In this case, electrical energy is not supplied to the high-speed electric motor 20.

The clutch 32 is maintained in an OFF state at the time of deceleration (within the deceleration driving section c). When the rotational speed of the high-speed electric motor 20, that is, the permissible RPM becomes 4,000 RPM or less while the clutch 32 is maintained in the OFF state, the speed of the low-speed electric motor 10 is increased to 4,000 RPM such that the high-speed electric motor 20 and the low-speed electric motor 10 are rotated at the same RPM, and then the clutch 32 is turned on (point B in FIG. 8). If the clutch 32 is turned on in a state in which the RPM of the low-speed electric motor 10 is not coincident with the RPM of the high-speed electric motor 20, the low-speed electric motor 10, which has been in a state in which the clutch 32 is separated from the low-speed electric motor 10 and the low-speed electric motor 10 is absolutely not rotated, is suddenly rotated, and as a result, loads are applied to mechanical parts or a shaft of the clutch 32, which may cause damage to or breakdowns of the clutch, the transmission, and the like, and for this reason, the clutch 32 is turned on after the RPM of the low-speed electric motor 10 is coincident with the RPM of the high-speed electric motor 20.

According to the wheel driving device and the wheel driving method for a hybrid construction machine according to the present disclosure, by the small-capacity low-speed electric motors, the small-capacity high-speed electric motors, the transmissions each having the clutch, and the control unit which are installed for all of the wheels each in the hybrid wheel loader, the wheel driving device drives only the low-speed electric motor during low-speed driving and drives only the high-speed electric motor during high-speed driving by turning on and off the clutch during the low-speed driving and the high-speed driving, thereby reducing manufacturing costs of the wheel driving device, improving fuel economy of the construction machine, reducing abrasion of tires mounted on the wheels, improving durability of the tires, and ensuring traveling stability.

In addition, the present disclosure is not limited to the modified embodiments illustrated in the drawings and the aforementioned exemplary embodiment, and other embodiments may be made without departing from the scope of the appended claims.

The invention claimed is:

1. A wheel driving device for a hybrid construction machine, which includes an engine which generates power, a motor generator which is connected to the engine and generates electrical energy, an electricity storage unit which is electrically connected to the motor generator, inverters which are connected to the electricity storage unit, and a plurality of wheels, the wheel driving device comprising:
   a plurality of first electric motors each of which is connected to each of the plurality of wheels and electrically connected to each of the inverters;
   a plurality of second electric motors each of which is connected to each of the plurality of wheels in parallel with the each of the plurality of first electric motors and electrically connected to each of the inverters;
   transmissions each of which has one side connected to each of the plurality of wheels, and the other side connected to each of the first electric motors and each of the second electric motors; and
   a control unit which controls transmission of driving power from the first electric motors and the second electric motors to the plurality of wheels via the transmission,
   wherein each of the transmissions includes a first speed reducer which is connected to both of the first electric motor and the second electric motor and reduces a rotational speed of the first electric motor or a rotational speed of the second electric motor,
   wherein each of the transmissions includes a clutch which is installed between the first speed reducer and the first electric motor and permits or cuts off power transmission from the first electric motor to the plurality of wheels, and
   wherein the control unit includes:
   a permissible RPM data storage unit which stores permissible RPM data of the first electric motor and the second electric motor;
   a permissible torque data storage unit which stores permissible torque data of the first electric motor and the second electric motor;
   a data receiving unit which receives data related to current RPM and current torque of the first electric motor or the second electric motor;
   a comparison unit which compares the permissible RPM and the permissible torque of the first electric motor and the second electric motor, which are stored in the permissible RPM data storage unit and the permissible torque data storage unit, with the current RPM and the current torque of the first electric motor or the second electric motor which are received by the data receiving unit; and
   a controller which controls on/off control for the clutch so as to drive the second electric motor by turning off the clutch when the current torque of the first electric motor is lower than the permissible torque as a result of the comparison by the comparison unit, and to drive the first electric motor by turning on the clutch when the current RPM of the second electric motor is equal to or lower than the permissible RPM.

2. The wheel driving device of claim 1, wherein each of the transmissions includes:
   a second speed reducer which is connected to the first electric motor and located between the first electric motor and the clutch wherein the second speed reducer reduces a rotational speed of the first electric motor.

3. The wheel driving device of claim 1, wherein the control unit controls to drive the first electric motors during a first speed driving, and controls to drive the second electric motors during a second speed driving.

4. The wheel driving device of claim 1, wherein the control unit controls to drive both of the first electric motors and the second electric motors together during a first speed driving.

5. The wheel driving device of claim 1, further comprising:
   a speed increaser which is installed between the engine and the motor generator.

6. The wheel driving device of claim 1, wherein each of the inverters is separately installed to each of the first electric motors and to each of the second electric motors, respectively.

7. The wheel driving device of claim 2, wherein the first electric motor and the second electric motor have the same electric motor capacity, and a reduction ratio of the second speed reducer is 3:1.

8. A wheel driving device for a hybrid construction machine, which includes an engine which generates power, a motor generator which is connected to the engine and generates electrical energy, an electricity storage unit which is electrically connected to the motor generator, inverters which are connected to the electricity storage unit, and a plurality of wheels, the wheel driving device comprising:
   a plurality of first electric motors each of which is connected to each of the plurality of wheels and electrically connected to each of the inverters;
   a plurality of second electric motors each of which is connected to each of the plurality of wheels in parallel with the each of the plurality of first electric motors and electrically connected to each of the inverters;
   transmissions each of which has one side connected to each of the plurality of wheels, and the other side connected to each of the first electric motors and each of the second electric motors;
   a first speed reducer which is connected to both of the first electric motor and the second electric motor and reduces a rotational speed of the first electric motor or a rotational speed of the second electric motor;
   a second speed reducer which is connected to the first electric motor and reduces a rotational speed of the first electric motor;
   a clutch which is installed between the first speed reducer and the second speed reducer, and permits or cuts off power transmission from the first electric motor to the plurality of wheels; and a control unit which controls transmission of driving power from the first electric motors and the second electric motors to the plurality of wheels via the transmission, wherein the first electric motor and the second electric motor have the same electric motor capacity, and a reduction ratio of the second speed reducer is 3:1.

* * * * *